(12) United States Patent
Okabe

(10) Patent No.: US 10,974,483 B2
(45) Date of Patent: Apr. 13, 2021

(54) LAMINATE SHEET, LIQUID CRYSTAL DISPLAY MODULE, BACKLIGHT UNIT, AND PRODUCTION METHOD OF LAMINATE SHEET

(71) Applicant: KEIWA INC., Tokyo (JP)

(72) Inventor: Motohiko Okabe, Tokyo (JP)

(73) Assignee: Keiwa Inc., Tokyo (JP)

( * ) Notice: Subject to any disclaimer, the term of this patent is extended or adjusted under 35 U.S.C. 154(b) by 114 days.

(21) Appl. No.: 15/746,650

(22) PCT Filed: Jul. 6, 2016

(86) PCT No.: PCT/JP2016/070045
§ 371 (c)(1),
(2) Date: Jan. 22, 2018

(87) PCT Pub. No.: WO2017/014051
PCT Pub. Date: Jan. 26, 2017

(65) Prior Publication Data
US 2018/0207907 A1    Jul. 26, 2018

(30) Foreign Application Priority Data
Jul. 23, 2015   (JP) .............................. JP2015-145532

(51) Int. Cl.
*G02B 5/02* (2006.01)
*G02F 1/1335* (2006.01)
(Continued)

(52) U.S. Cl.
CPC ............ *B32B 7/02* (2013.01); *B29C 48/0021* (2019.02); *B29C 48/08* (2019.02); *B29C 48/305* (2019.02);
(Continued)

(58) Field of Classification Search
CPC ......... B32B 7/02; B32B 7/023; B29C 48/305; B29C 48/30; B29C 48/0021; B29C 48/08;
(Continued)

(56) References Cited

U.S. PATENT DOCUMENTS

2005/0181146 A1* 8/2005 Yoneyama ............... G02B 1/111
428/1.31
2014/0146560 A1* 5/2014 Kim .......................... F21V 7/05
362/606
(Continued)

FOREIGN PATENT DOCUMENTS

| CN | 102129092 A | 7/2011 |
|----|-------------|--------|
| CN | 102859398 A | 1/2013 |

(Continued)

OTHER PUBLICATIONS

English translation of JP 2011150074; Assignee: Sumitomo Chemical Co., Ltd.; translation downloaded on Jul. 10, 2019 from WIPO website at https://patentscope.wipo.int/search/en/search.jsf (Year: 2011).*

*Primary Examiner* — Angela K Davison
(74) *Attorney, Agent, or Firm* — Norris McLaughlin, P.A.

(57) ABSTRACT

A laminate sheet includes an intermediate layer, a first matte layer laminated on a front face side of the intermediate layer, and a second matte layer laminated on a back face side of the intermediate layer. A ratio of a gloss at 60° of a back face of the second matte layer to a gloss at 60° of a front face of the first matte layer is no less than 3/2 and no greater than 10. The gloss at 60° of the front face of the first matte layer is preferably no less than 5 and no greater than 20. The gloss at 60° of the back face of the second matte layer is preferably no less than 30 and no greater than 80. An arithmetic average roughness of the front face of the first matte layer is preferably no less than 0.5 μm and no greater than 1 μm.

13 Claims, 5 Drawing Sheets

(51) Int. Cl.
*G02B 5/30* (2006.01)
*B32B 7/02* (2019.01)
*B29C 48/00* (2019.01)
*B29C 48/305* (2019.01)
*B29C 48/08* (2019.01)
*B29K 69/00* (2006.01)
*B29L 31/34* (2006.01)
*G02F 1/13363* (2006.01)

(52) U.S. Cl.
CPC ......... *G02B 5/0221* (2013.01); *G02B 5/0226* (2013.01); *G02F 1/133504* (2013.01); *B29K 2069/00* (2013.01); *B29L 2031/3475* (2013.01); *B32B 2457/202* (2013.01); *G02B 5/3025* (2013.01); *G02F 1/13363* (2013.01); *G02F 1/133536* (2013.01); *G02F 2001/133567* (2013.01)

(58) Field of Classification Search
CPC .. G02B 5/0221; G02B 5/0226; G02B 5/3025; G02B 5/3041; G02B 5/3033; G02B 1/11; G02B 1/111; G02F 1/133504; G02F 1/133536; G02F 2001/133567; B29K 2069/00

See application file for complete search history.

(56) References Cited

U.S. PATENT DOCUMENTS

| | | | |
|---|---|---|---|
| 2015/0293273 | A1* | 10/2015 | Chen .................. G02B 5/0278 362/355 |
| 2016/0009915 | A1* | 1/2016 | Sun ........................ C08L 69/00 525/68 |

FOREIGN PATENT DOCUMENTS

| | | |
|---|---|---|
| JP | 3-101864 A | 4/1991 |
| JP | 2007-179035 A | 7/2007 |
| JP | 2011-075964 | 4/2011 |
| JP | 2011-123380 A | 6/2011 |
| JP | 2011-128606 A | 6/2011 |
| JP | 2011-150074 A | 8/2011 |
| JP | 2014-164137 A | 9/2014 |
| TW | 201134662 A | 10/2011 |
| TW | 201223740 A | 6/2012 |

\* cited by examiner

LAMINATE SHEET, LIQUID CRYSTAL DISPLAY MODULE, BACKLIGHT UNIT, AND PRODUCTION METHOD OF LAMINATE SHEET

TECHNICAL FIELD

The present invention relates to a laminate sheet, a liquid crystal display module, a backlight unit, and a production method of a laminate sheet.

BACKGROUND ART

Liquid crystal display devices have come into wide use as flat panel displays, taking advantage of their characteristic features such as thinness, lightweight and power saving, and have found an increasingly wide variety of uses for televisions, personal computers, mobile phone terminals such as smartphones, personal digital assistance such as tablet terminals, and the like.

Conventionally, a common liquid crystal display device includes, as shown in FIG. 5(a), a liquid crystal panel 101, various types of optical sheets 102 disposed on a back face side (the side opposite to a viewer) of the liquid crystal panel 101, and a backlight 103 disposed on a back face side of the various types of optical sheets 102. The liquid crystal panel 101 has a structure including a pair of polarizing plates 104 and 105 with a liquid crystal cell 106 therebetween, and various types of display modes such as a twisted nematic (TN) mode, a vertical alignment (VA) mode, and an in plane switching (IPS) mode have been proposed. The backlight 103 illuminates the liquid crystal panel 101 from the back face side, and is commonly an edge-lit (side-lit) backlight, a direct-lit backlight, or the like. The various types of optical sheets 102 are disposed between the liquid crystal panel 101 and the backlight 103 such that rays of light emitted from a front face of the backlight 103 are allowed to enter the entire surface of the liquid crystal panel 101 efficiency and uniformly. A light diffusion sheet having the function of condensing and diffusing the rays of light toward the normal direction, a prism sheet having the function of refracting the rays of light toward the normal direction, and the like are used as the various types of optical sheets 102.

In general, the pair of polarizing plates 104 and 105 to be included in the liquid crystal panel 101 is capable of absorbing one-direction component of light and transmitting the other polarization components of light. In theory, the polarizing plates 104 and 105 absorb 50% of light in order to enable polarization, leading to one cause of the low utilization efficiency of light in the liquid crystal display device.

In an attempt to improve the low utilization efficiency of light caused by the polarizing plates 104 and 105, disposing a reflective polarizing sheet 107 between the liquid crystal panel 101 and the various types of optical sheets 102 is proposed as shown in FIG. 5(b). The reflective polarizing sheet 107 is provided to permit reuse of rays of light by transmitting a specific polarization component of light and reflecting the other polarization components of the light. For example, when the transmission axial orientation of the reflective polarizing sheet 107 coincides with the transmission axial orientation of the polarizing plate 105 disposed on the back face side of the liquid crystal panel 101, light absorption by the polarizing plate 105 is prevented, thereby enabling the utilization efficiency of light to be improved.

The reflective polarizing sheet 107 is also proposed in which diffusion sheets are each laminated on the front and back faces of a reflective polarizer (see Japanese Unexamined Patent Application, Publication No. 2011-75964). Owing to the diffusion sheets each laminated on the front and back faces of the reflective polarizer disclosed in the publication, the reflective polarizing sheet reportedly enables inhibition of the lack in uniformity of luminance caused by the light sources disposed on the back face side and the shape of prism portions of the prism sheet.

PRIOR ART DOCUMENT

Patent Document

Patent Document 1: Japanese Unexamined Patent Application, Publication No. 2011-75964

SUMMARY OF THE INVENTION

Problems to be Solved by the Invention

Although the conventional reflective polarizing sheet enables inhibition of the lack in uniformity of luminance caused by the light sources disposed on the back face side and the shape of the prism portions of the prism sheet, sparkles may occur due to the interference between the shape of the front face of the diffusion sheet laminated on the front face side of the reflective polarizer and the pixel pitch of the liquid crystal panel. With advances in the miniaturization of the pixel pitch of the liquid crystal panel, the risk of sparkles occurring due to the interference between the shape of the front face of the reflective polarizer and the pixel pitch of the liquid crystal panel has been increasing.

The present invention has been made in view of such circumstances, and an object thereof is to provide a laminate sheet, a liquid crystal display module, a backlight unit, and a production method of a laminate sheet that enable inhibition of the occurrence of sparkles caused by the interference with the pixel pitch of the liquid crystal panel while reducing the lack in uniformity of luminance caused by the shape of other optical member disposed on a back face side.

Means for Solving the Problems

A laminate sheet according to an aspect of the present invention made for solving the aforementioned problems includes an intermediate layer, a first matte layer laminated on a front face side of the intermediate layer, and a second matte layer laminated on a back face side of the intermediate layer. A ratio of a gloss at 60° of a back face of the second matte layer to a gloss at 60° of a front face of the first matte layer is no less than 3/2 and no greater than 10.

The laminate sheet is disposed, for example, between a liquid crystal panel of a liquid crystal display device and an optical sheet (e.g., a prism sheet, a light diffusion sheet, etc.) on a back face side of the liquid crystal panel. When disposed between the liquid crystal panel and the optical sheet as mentioned above, the laminate sheet enables inhibition of the lack in uniformity of luminance caused by the shape of the optical sheet and inhibition of sparkles (hereinafter, may be also referred to as "glare", "graininess", "moire screen pattern", "light interference", "unevenness", and "bright spots") caused by the interference with the pixel pitch of the liquid crystal panel. Although not necessarily clarified, the reasons for the aforementioned effects are inferred as in the following. The first matte layer laminated on the front face side of the intermediate layer and the second matte layer laminated on the back face side of the intermediate layer are provided. In addition, the ratio of the gloss at 60° of the back face of the second matte layer to the gloss at 60° of the front face of the first matte layer is no less than 3/2 and no greater than 10. Accordingly, the rays of light incident from the back face side are diffused by the back face of the second matte layer to some extent, and then are adequately diffused by the front face of the first matte layer before exiting from the front face side. This would conceivably enable the reduction in the lack in uniformity of luminance caused by the shape of the other optical member disposed on the back face side. Furthermore, since the ratio of the gloss at 60° of the front face of the first matte layer to the gloss at 60° of the back face of the second matte layer is no less than 1/10 and no greater than 2/3, rays of light emitted from the front face are diffused adequately, and thus sparkles caused by the interference with the pixel pitch of the liquid crystal panel would be conceivably inhibited. In addition, when being insufficiently diffused by the first matte layer, rays of light interfere at extended intervals. In a case where the interval is greater than each liquid crystal cell, the intensity of light would vary among liquid crystal cells. To the contrary, when being sufficiently diffused by the first matte layer, rays of light interfere at shorter intervals. Thus, the intensity of light varies within each liquid crystal cell, and accordingly would be less likely to vary among liquid crystal cells.

The gloss at 60° of the front face of the first matte layer is preferably no less than 5 and no greater than 20. The configuration in which the gloss at 60° of the front face of the first matte layer falls within the above range enables the effect of reducing the lack in uniformity of luminance caused by the shape of the other optical member disposed on the back face side and the effect of inhibiting the occurrence of sparkles caused by the interference with the pixel pitch of the liquid crystal panel to be produced more properly.

The gloss at 60° of the back face of the second matte layer is preferably no less than 30 and no greater than 80. The configuration in which the gloss at 60° of the back face of the second matte layer falls within the above range enables the reduction in the lack in uniformity of luminance caused by the shape of the other optical member disposed on the back face side while inhibiting a decrease in face luminance.

An arithmetic average roughness (Ra) of the front face of the first matte layer is preferably no less than 0.5 µm and no greater than 1 µm. The configuration in which the arithmetic average roughness (Ra) of the front face of the first matte layer falls within the above range readily enables inhibition of the occurrence of sparkles caused by the interference with the pixel pitch of a high-resolution liquid crystal panel.

A ratio of an arithmetic average roughness (Ra) of the back face of the second matte layer to the arithmetic average roughness (Ra) of the front face of the first matte layer is preferably no less than 1/5 and no greater than 9/10. The configuration in which the arithmetic average roughness (Ra) of the back face of the second matte layer falls within the above range enables the reduction in the lack in uniformity of luminance caused by the shape of the other optical member disposed on the back face side while inhibiting the decrease in face luminance.

A ten-point average roughness (Rzjis) of the front face of the first matte layer is preferably no less than 1.5 µm and no greater than 4 µm, and an average length (RSm) of roughness profile elements of the front face of the first matte layer is preferably no less than 60 µm and no greater than 140 µm. The configuration in which the ten-point average roughness (Rzjis) and the average length (RSm) of the roughness profile elements of the front face of the first matte layer fall within the respective ranges readily enables inhibition of the occurrence of sparkles caused by the interference with the pixel pitch of the high-resolution liquid crystal panel.

A ratio of a ten-point average roughness (Rzjis) of the back face of the second matte layer to the ten-point average roughness (Rzjis) of the front face of the first matte layer is preferably no less than 1/5 and no greater than 9/10, and a ratio of an average length (RSm) of roughness profile elements of the back face of the second matte layer to the average length (RSm) of the roughness profile elements of the front face of the first matte layer is preferably no less than 6/5 and no greater than 3. The configuration in which the ten-point average roughness (Rzjis) and the average length (RSm) of the roughness profile elements of the back face of the second matte layer fall within the respective ranges enables the reduction in the lack in uniformity of luminance caused by the shape of the other optical member disposed on the back face side while inhibiting the decrease in face luminance.

The first matte layer and the second matte layer each preferably contain an amorphous resin as a principal component. By virtue of containing an amorphous resin as the principal component, the first matte layer and the second matte layer have improved transparency, whereby inhibition of the reduction in luminance is enabled. Furthermore, since the amorphous resin has superior impact resistance, inhibition of the generation of scratches on the laminate sheet is enabled.

A retardation value (Re) of each of the first matte layer and the second matte layer is preferably no greater than 50 nm. The configuration in which the retardation value (Re) of each of the first matte layer and the second matte layer falls within the above range enables the reduction in polarization orientation conversion caused by the first matte layer and the second matte layer, and thus enables the improved luminance to be achieved.

It is preferred that neither the first matte layer nor the second matte layer contains a light diffusing agent. When neither the first matte layer nor the second matte layer contains a light diffusing agent, the haze value of each of the first matte layer and the second matte layer is readily reduced.

It is preferred that the first matte layer contains a resin matrix and a light diffusing agent. In the case where the first matte layer contains the resin matrix and the light diffusing agent, rays of light emitted from the front face are readily diffused due to the external diffusion arising from the shape of the front face of the first matte layer and the internal diffusion arising from, for example, the difference between the refractive indices of the light diffusing agent and the resin matrix.

It is preferred that the intermediate layer is a reflective polarizing layer. By virtue of the intermediate layer being a reflective polarizing layer, reuse of rays of light reflected by the reflective polarizing layer is permitted, leading to improved utilization efficiency of light. In addition, by virtue of including the first matte layer laminated on the front face side of the reflective polarizing layer, the laminate sheet enables inhibition of glare caused by the reflective polarizing layer.

A liquid crystal display module according to another aspect of the present invention made for solving the aforementioned problems includes the laminate sheet of the aspect of the present invention and a liquid crystal display module disposed on a front face of the laminate sheet.

By virtue of including the laminate sheet disposed on the back face of the liquid crystal panel, the liquid crystal display module enables inhibition of sparkles caused by the interference with the pixel pitch of the liquid crystal panel as mentioned above. Furthermore, by virtue of including the laminate sheet disposed on the back face of the liquid crystal panel, the liquid crystal display module enables the reduction in the lack in uniformity of luminance caused by the shape of the other optical member disposed on the back face side of the laminate sheet as mentioned above.

A backlight unit according to still another aspect of the present invention made for solving the aforementioned problems includes the laminate sheet of the aspect of the present invention and an optical sheet disposed on a back face of the laminate sheet.

By virtue of including the laminate sheet disposed on a front face of the optical sheet, the backlight unit enables inhibition of sparkles caused by the interference with the pixel pitch of the liquid crystal panel while reducing the lack in uniformity of luminance caused by the shape of the optical sheet.

A production method of a laminate sheet according to yet another aspect of the present invention made for solving the aforementioned problems includes: extruding a molten material for forming a first matte layer to give a sheet shape; sequentially pressurizing the extruded material for forming the first matte layer between a first mat roller and a first press roller; bonding to a front face side of an intermediate layer, the pressurized material for forming the first matte layer on a contact surface with the first press roller; extruding a molten material for forming a second matte layer to give a sheet shape; sequentially pressurizing the extruded material for forming the second matte layer between a second mat roller and a second press roller; and bonding to a back face side of the intermediate layer, the pressurized material for forming the second matte layer on a contact surface with the second press roller. A ratio of a gloss at 60° of a back face of the second matte layer to a gloss at 60° of a front face of the first matte layer is no less than 3/2 and no greater than 10.

The production method of a laminate sheet enables a laminate sheet to be produced which includes: a first matte layer on a front face side of an intermediate layer; and a second matte layer on a back face side of the intermediate layer, with a ratio of a gloss at 60° of a back face of the second matte layer to a gloss at 60° of a front face of the first matte layer being no less than 3/2 and no greater than 10. The laminate sheet produced by using the production method of a laminate sheet enables the reduction in the lack in uniformity of luminance caused by the shape of the other optical member disposed on the back face side while enabling inhibition of sparkles caused by the interference with the pixel pitch of the liquid crystal panel as mentioned above.

It is to be noted that the term "front face side" as referred to herein means a viewer's side of a liquid crystal display device, and the term "back face side" as referred to herein means the opposite side thereof. The term "gloss" as referred to herein means a value determined in accordance with JIS-Z8741: 1997. In addition, the "gloss at 60° of the front face of the first matte layer" and the "gloss at 60° of the back face of the second matte layer" may be determined after detaching the first matte layer and the second matte layer from the intermediate layer and covering over a face opposite to a measurement face of each of the first matte layer and the second matte layer with black marker ink in order to eliminate a possible influence of the face opposite to the measurement face. The term "arithmetic average roughness (Ra)" and the term "average length (RSm)" of the roughness profile elements" as referred to herein means a value determined in accordance with JIS-B0601: 2001, with a cut-off λc of 2.5 mm and an evaluation length of 12.5 mm. The term "ten-point average roughness (Rzjis)" as referred to herein means a value determined in accordance with JIS-B0601: 1994, with a cut-off λc of 2.5 mm and an evaluation length of 12.5 mm. The term "principal component" as referred to herein means a component contained in the highest proportion, and refers to a component present in a proportion of, for example, no less than 50% by mass, preferably no less than 70% by mass, and more preferably no less than 90% by mass. The term "retardation value (Re)" as referred to herein means an in-plane retardation value determined with light (sodium D line) of 589 nm wavelength.

Effects of the Invention

As described in the foregoing, a laminate sheet, a liquid crystal display module, a backlight unit, and a production method of a laminate sheet according to the aspects of the present invention enable inhibition of the occurrence of sparkles caused by the interference with the pixel pitch of the liquid crystal panel while reducing the lack in uniformity of luminance caused by the shape of the other optical member disposed on the back face side.

DESCRIPTION OF EMBODIMENTS

Hereinafter, embodiments of the present invention will be described in detail with appropriate references to the drawings.

First Embodiment

Laminate Sheet

Figure 1:
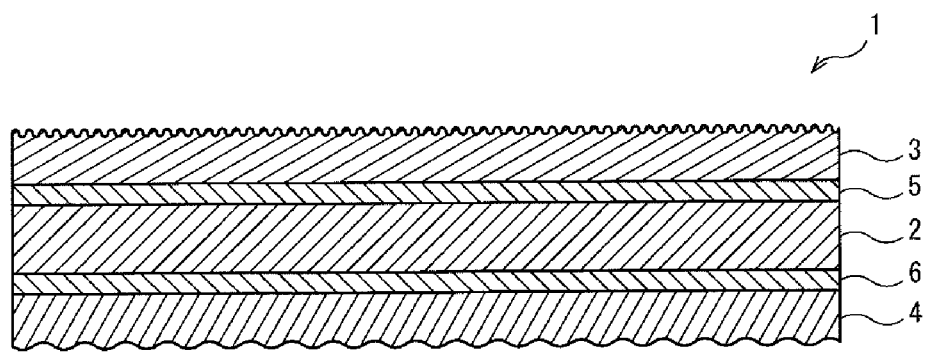
FIG. 1 shows a schematic end view of a laminate sheet according to a first embodiment of the present invention.

The laminate sheet 1 shown in FIG. 1 is disposed, for example, on the back face of a liquid crystal panel of a liquid crystal display device, and in particular, is disposed between the liquid crystal panel and an optical sheet (e.g., a prism sheet or a light diffusion sheet, etc.) on the back face side of the liquid crystal panel. The laminate sheet 1 shown in FIG. 1 includes an intermediate layer 2, a first matte layer 3 laminated on the front face side of the intermediate layer 2, and a second matte layer 4 laminated on the back face side of the intermediate layer 2. The laminate sheet 1 is formed in such a manner that the intermediate layer 2 and the first matte layer 3 are bonded together with an adhesive 5 and that the intermediate layer 2 and the second matte layer 4 are bonded together with an adhesive 6. The laminate sheet 1 has a three-layer structure including the intermediate layer 2, the first matte layer 3 and the second matte layer 4. The laminate sheet 1 is formed to be entirely transparent so as to transmit rays of light.

The lower limit of the surface area of the laminate sheet 1 is preferably 150 cm$^2$, more preferably 180 cm$^2$, and still more preferably 200 cm$^2$. On the other hand, the upper limit of the surface area of the laminate sheet 1 is preferably 840 cm$^2$, more preferably 760 cm$^2$, and still more preferably 720 cm$^2$. When the surface area of the laminate sheet 1 is less than the lower limit, the laminate sheet 1 may not be used in larger size terminals other than small-size mobile terminals. To the contrary, when the surface area of the laminate sheet 1 is greater than the upper limit, bending is likely to occur.

Intermediate Layer

The intermediate layer 2 shown in FIG. 1 is in the form of film, which is not particularly limited thereto. It is preferred that the intermediate layer 2 has no light diffusion function so as not to impair the light diffusion effects produced by the first matte layer 3 and the second matte layer 4, and it is thus preferred that the intermediate layer 2 contains no diffusion element such as a light diffusing agent. Although the intermediate layer 2 may be provided as appropriate to fit the intended use of the laminate sheet 1 according to the embodiments of the present invention, the intermediate layer 2 shown in FIG. 1 is provided as a reflective polarizing layer capable of transmitting a specific polarization component of light and reflecting the other polarization components of light. In this case, the intermediate layer 2 may be a linear polarization splitting layer that reflects a first linear polarization component and transmits the other linear polarization components, or may be a circular polarization splitting layer that reflects a circular polarization component rotating in a first rotation direction and transmits a circular polarization component rotating in the direction opposite to the first rotation direction.

In the case where the intermediate layer 2 is the linear polarization splitting layer, the specific configuration of the intermediate layer 2 is exemplified by a multilayer structure in which layers having birefringent properties and layers having substantially no birefringent properties are laminated in an alternating manner. On the other hand, in the case where the intermediate layer 2 is the circular polarization splitting layer, the specific configuration of the intermediate layer 2 is exemplified by a laminate including a light reflection layer with a cholesteric liquid crystal phase fixed therein and a λ/4 layer laminated on the front face side of the light reflection layer.

By virtue of the intermediate layer 2 being a reflective polarizing layer, the laminate sheet 1 permits the reuse of rays of light reflected by the reflective polarizing layer, thereby enabling the utilization efficiency of light to be improved.

The lower limit of the average thickness of the intermediate layer 2 is preferably 30 μm, and more preferably 40 μm. On the other hand, the upper limit of the average thickness of the intermediate layer 2 is preferably 100 μm, and more preferably 80 μm. When the average thickness of the intermediate layer 2 is less than the lower limit, the intermediate layer 2 may have insufficient mechanical strength, and thus may curl when the first matte layer 3 and the second matte layer 4 are laminated thereon. To the contrary, when the average thickness of the intermediate layer 2 is greater than the upper limit, the laminate sheet 1 may be unduly thickened.

First Matte Layer

The first matte layer 3 constitutes the frontmost face of the laminate sheet 1. The first matte layer 3 may be formed by, for example, an extrusion molding process. The first matte layer 3 includes projections and recesses formed substantially uniformly on the entire front face thereof. The projections and recesses are minute and are densely formed so as to sufficiently inhibit the occurrence of sparkles caused by the interference with the pixel pitch of the liquid crystal panel.

The lower limit of the average thickness of the first matte layer 3 is preferably 50 μm, more preferably 80 μm, and still more preferably 100 μm. On the other hand, the upper limit of the average thickness of the first matte layer 3 is preferably 400 μm, more preferably 300 μm, and still more preferably 200 μm. When the average thickness of the first matte layer 3 is less than the lower limit, the first matte layer 3 may fail to sufficiently reinforce the mechanical strength, heat resistance, etc., of the intermediate layer 2 on the front face side thereof. To the contrary, when the average thickness of the first matte layer 3 is greater than the upper limit, the laminate sheet 1 may be unduly thickened.

The lower limit of the gloss at 60° of the front face of the first matte layer 3 (the gloss at 60° of the front face of the laminate sheet 1) is preferably 5, and more preferably 7. On the other hand, the upper limit of the gloss at 60° of the front face of the first matte layer 3 is preferably 20, more preferably 15, and still more preferably 12. When the gloss at 60° of the first matte layer 3 is less than the lower limit, the first matte layer 3 may have a higher haze value and may accordingly have a low light transmittance, so that the liquid crystal display device including the laminate sheet 1 may have an insufficient face luminance. To the contrary, when the gloss at 60° of the first matte layer 3 is greater than the upper limit, the lack in uniformity of luminance caused by the shape of the other optical member disposed on the back face side of the laminate sheet 1 may not be reduced sufficiently. On the other hand, the configuration in which the gloss at 60° of the front face of the first matte layer 3 falls within the above range enables the effect of reducing the lack in uniformity of luminance caused by the shape of the other optical member disposed on the back face side of the laminate sheet 1 and the effect of inhibiting the occurrence of sparkles caused by the interference with the pixel pitch of the liquid crystal panel to be produced more properly.

The lower limit of the arithmetic average roughness (Ra) of the front face of the first matte layer 3 (the arithmetic average roughness (Ra) of the front face of the laminate sheet 1) is preferably 0.5 μm, and more preferably 0.6 μm. On the other hand, the upper limit of the arithmetic average roughness (Ra) of the front face of the first matte layer 3 is preferably 1 μm, and more preferably 0.9 μm. When the arithmetic average roughness (Ra) of the front face of the first matte layer 3 is less than the lower limit, rays of light may be diffused insufficiently, and thus the lack in uniformity of luminance caused by the shape of the other optical member disposed on the back face side of the laminate sheet 1 may not be reduced sufficiently. To the contrary, when the arithmetic average roughness (Ra) of the front face of the first matte layer 3 is greater than the upper limit, the occurrence of sparkles caused by the interference with the pixel pitch of the high-resolution liquid crystal panel may not be inhibited.

The lower limit of the ten-point average roughness (Rzjis) of the front face of the first matte layer 3 (the ten-point average roughness (Rzjis) of the front face of the laminate sheet 1) is preferably 1.5 µm, more preferably 2 µm, and still more preferably 2.5 µm. On the other hand, the upper limit of the ten-point average roughness (Rzjis) of the front face of the first matte layer 3 is preferably 4 µm, more preferably 3.5 µm, and still more preferably 3.2 µm. When the ten-point average roughness (Rzjis) of the front face of the first matte layer 3 is less than the upper limit, rays of light may be diffused insufficiently, and thus the lack in uniformity of luminance caused by the shape of the other optical member disposed on the back face side of the laminate sheet 1 may not be reduced sufficiently. To the contrary, when the ten-point average roughness (Rzjis) of the front face of the first matte layer 3 is greater than the upper limit, the occurrence of sparkles caused by the interference with the pixel pitch of the high-resolution liquid crystal panel may not be inhibited.

The lower limit of the average length (RSm) of the roughness profile elements of the front face of the first matte layer 3 (the average length (RSm) of the roughness profile elements of the front face of the laminate sheet 1) is preferably 60 µm, more preferably 80 µm, and still more preferably 100 µm. On the other hand, the upper limit of the average length (RSm) of the roughness profile elements of the front face of the first matte layer 3 is preferably 140 µm, more preferably 120 µm, and still more preferably 110 µm. When the average length (RSm) of the roughness profile elements of the front face of the first matte layer 3 is less than the lower limit, it may be difficult to form the shape of the front face of the first matte layer 3. To the contrary, when the average length (RSm) of the roughness profile elements of the front face of the first matte layer 3 is greater than the upper limit, the occurrence of sparkles caused by the interference with the pixel pitch of the high-resolution liquid crystal panel may not be inhibited.

For the laminate sheet 1, it is particularly preferred that both the ten-point average roughness (Rzjis) and the average length (RSm) of the roughness profile elements of the front face of the first matte layer 3 fall within the respective ranges. By virtue of the ten-point average roughness (Rzjis) and the average length (RSm) of the roughness profile elements of the front face of the first matte layer 3 falling within the respective ranges, the laminate sheet 1 readily enables inhibition of the occurrence of sparkles caused by the interference with the pixel pitch of the high-resolution liquid crystal panel.

The lower limit of the maximum height roughness (Rz) of the front face of the first matte layer 3 (the maximum height roughness (Rz)) of the front face of the laminate sheet 1) is preferably 1.5 µm, more preferably 2 µm, and still more preferably 3 µm. On the other hand, the upper limit of the maximum height roughness (Rz) of the front face of the first matte layer 3 is preferably 15 µm, more preferably 10 µm, and still more preferably 8 µm. When the maximum height roughness (Rz) of the front face of the first matte layer 3 is less than the lower limit, rays of light may be diffused insufficiently, and thus the lack in uniformity of luminance caused by the shape of the other optical member disposed on the back face side of the laminate sheet 1 may not be reduced sufficiently. To the contrary, when the maximum height roughness (Rz) of the front face of the first matte layer 3 is greater than the upper limit, the occurrence of sparkles caused by the interference with the pixel pitch of the high-resolution liquid crystal panel may not be inhibited. The term "maximum height roughness (Rz)" as referred to herein means a value determined in accordance with JIS-B0601: 2001, with a cut-off $\lambda c$ of 2.5 mm and an evaluation length of 12.5 mm.

Since the first matte layer 3 needs to transmit rays of light, the first matte layer 3 contains a transparent, in particular a colorless and transparent, synthetic resin as a principal component. Examples of the principal component of the first matte layer 3 include a polycarbonate, an acrylic resin, a cycloolefin resin, polypropylene, polyethylene terephthalate, and the like. Of these, an amorphous resin such as a polycarbonate or an acrylic resin is preferred as the principal component of the first matte layer 3, and a polycarbonate is particularly preferred. By virtue of containing an amorphous resin as the principal component, the first matte layer 3 of the laminate sheet 1 has improved transparency, whereby inhibition of the reduction in luminance of the liquid crystal display device including the laminate sheet 1 is enabled. Furthermore, since the amorphous resin has superior impact resistance, inhibition of the generation of scratches on the laminate sheet 1 is enabled.

The polycarbonate is not particularly limited, and may either a linear polycarbonate or a branched polycarbonate, or may be a polycarbonate containing both the linear polycarbonate and the branched polycarbonate.

The linear polycarbonate is exemplified by a linear aromatic polycarbonate produced by a well-known process such as a phosgene process or a melt process and includes a carbonate component and a diphenol component. Examples of a precursor for introducing the carbonate component include phosgene, diphenyl carbonate, and the like. Examples of the diphenol include 2,2-bis(4-hydroxyphenyl)propane, 2,2-bis(3,5-dimethyl-4-hydroxyphenyl)propane, 1,1-bis(4-hydroxyphenyl)cyclohexane, 1,1-bis(3,5-dimethyl-4-hydroxyphenyl)cyclohexane, 1,1-bis(4-hydroxyphenyl)decane, 1,1-bis(4-hydroxyphenyl)cyclodecane, 1,1-bis(4-hydroxyphenyl)propane, 1,1-bis(3,5-dimethyl-4-hydroxyphenyl)cyclododecane, 4,4'-dihydroxydiphenyl ether, 4,4'-thiodiphenol, 4,4'-dihydroxy-3,3-dichlorodiphenyl ether, and the like. These may be used either alone or in combination of two or more types thereof.

The branched polycarbonate is exemplified by a polycarbonate produced by using a branching agent, and examples of the branching agent include phloroglucin, trimellitic acid, 1,1,1-tris(4-hydroxyphenyl)ethane, 1,1,2-tris(4-hydroxyphenyl)ethane, 1,1,2-tris(4-hydroxyphenyl)propane, 1,1,1-tris(4-hydroxyphenyl)methane, 1,1,1-tris(4-hydroxyphenyl)propane, 1,1,1-tris(2-methyl-4-hydroxyphenyl)methane, 1,1,1-tris(2-methyl-4-hydroxyphenyl)ethane, 1,1,1-tris(3-methyl-4-hydroxyphenyl)methane, 1,1,1-tris(3-methyl-4-hydroxyphenyl)ethane, 1,1,1-tris(3,5-dimethyl-4-hydroxyphenyl)methane, 1,1,1-tris(3,5-dimethyl-4-hydroxyphenyl)ethane, 1,1,1-tris(3-chloro-4-hydroxyphenyl)methane, 1,1,1-tris(3-chloro-4-hydroxyphenyl)ethane, 1,1,1-tris(3,5-dichloro-4-hydroxyphenyl)methane, 1,1,1-tris(3,5-dichloro-4-hydroxyphenyl)ethane, 1,1,1-tris(3-bromo-4-hydroxyphenyl)methane, 1,1,1-tris(3-bromo-4-hydroxyphenyl)ethane, 1,1,1-tris(3,5-dibromo-4-hydroxyphenyl)methane, 1,1,1-tris(3,5-dibromo-4-hydroxyphenyl)ethane, 4,4'-dihydroxy-2,5-dihydroxydiphenyl ether, and the like.

It is to be noted the first matte layer 3 may contain, in addition to the principal component, various types of additives such as an antioxidant, an antistatic agent, a fire retardant, a heat stabilizer, an ultraviolet ray absorbing agent, a fungicide, a plasticizer, a tackifier and a reinforcing agent.

It is preferred that the first matte layer 3 does not contain a light diffusing agent. When the first matte layer 3 does not contain a light diffusing agent, the control of the haze value of the first matte layer 3 is facilitated. It is to be noted that "not contain a light diffusing agent" refers to not only the state in which literally no light diffusing agent is contained but also the state in which the content of the light diffusing agent falls within a range not leading to impairment of the object of the present invention (e.g., the state in which the content of the light diffusing agent is sufficiently low to exert no influence on the optical characteristics of the first matte layer 3, and the state in which the light diffusing agent is appropriately dispersed in the first matte layer 3 and thus exerts no influence on the optical characteristics of the first matte layer 3).

The upper limit of the retardation value (Ra) of the first matte layer 3 is preferably 50 nm, more preferably 20 nm, and still more preferably 10 nm. When the retardation value (Ra) of the first matte layer 3 is greater than the upper limit, the polarization orientation conversion may not be sufficiently reduced, and thus the face luminance of the liquid crystal display device including the laminate sheet 1 may not be sufficiently improved. It is to be noted that the lower limit of the retardation value (Ra) of the first matte layer 3 is not particularly limited, and may be, for example, 0 nm.

The lower limit of the haze value of the first matte layer 3 is preferably 50%, more preferably 55%, and still more preferably 60%. The upper limit of the haze value of the first matte layer 3 is preferably 80%, more preferably 75%, and still more preferably 70%. When the haze value of the first matte layer 3 is less than the lower limit, rays of light may be diffused insufficiently, and thus the lack in uniformity of luminance caused by the shape of the other optical member disposed on the back face side of the laminate sheet 1 may not be reduced sufficiently. To the contrary, when the haze value of the first matte layer 3 is greater than the upper limit, the face luminance of the liquid crystal display device including the laminate sheet 1 may not be sufficiently improved. It is to be noted that the term "haze value" as referred to herein means a value determined in accordance with JIS-K7361: 2000.

Second Matte Layer

The second matte layer 4 constitutes the backmost face of the laminate sheet 1. The second matte layer 4 may be formed by, for example, an extrusion molding process. The second matte layer 4 includes projections and recesses formed substantially uniformly on the entire back face thereof. The projections and recesses reduce, to some extent, the lack in uniformity of luminance caused by the shape of the other optical member disposed on the back face side of the laminate sheet 1. In a case where the light diffusion function of the second matte layer is on about the same level as that of the first matte layer, the reduction in the lack in uniformity of luminance caused by the shape of the other optical member disposed on the back face side of the laminate sheet may be achieved, whereas an increase in the haze value of the second matter layer causes a decrease in the face luminance of the liquid crystal display device. To the contrary, in a case where the light diffusion function of the second matte layer is extremely inferior, the light diffusion function of the first matte layer needs to be enhanced in order to sufficiently reduce the lack in uniformity of luminance caused by the shape of the other optical member disposed on the back face side of the laminate sheet. However, in the case where the light diffusion of the first matte layer 3 is enhanced, the surface roughness or the like of the first matte layer is so great that the occurrence of sparkles caused by the interference with the pixel pitch of the high-resolution liquid crystal panel may not be sufficiently inhibited. In this regard, the laminate sheet 1 includes the projections and recesses of the first matte layer 3 and the second matte layer 4 having been optimized, thereby enabling inhibition of the decrease in the face luminance of the liquid crystal display device including the laminate sheet 1 while reducing the lack in uniformity of luminance caused by the shape of the other optical member disposed on the back face side of the laminate sheet 1, and inhibiting sparkles caused by the interference between the pixel pitch of the liquid crystal panel and the projections and recesses of the front face of the first matte layer 3.

The lower limit of the average thickness of the second matte layer 4 is preferably 50 μm, more preferably 80 μm, and still more preferably 100 μm. On the other hand, the upper limit of the average thickness of the second matte layer 4 is preferably 400 μm, more preferably 300 μm, and still more preferably 200 μm. When the average thickness of the second matte layer 4 is less than the lower limit, the second matte layer 4 may fail to sufficiently reinforce the mechanical strength and heat resistance, etc., of the intermediate layer 2 on the back face side thereof. To the contrary, when the average thickness of the second matte layer 4 is greater than the upper limit, the laminate sheet 1 may be unduly thickened.

The lower limit of the gloss at 60° of the back face of the second matte layer 4 (the gloss at 60° of the back face of the laminate sheet 1) is preferably 30, more preferably 35, and still more preferably 37. On the other hand, the upper limit of the gloss at 60° of the back face of the second matte layer 4 is preferably 80, more preferably 60, and still more preferably 45. When the gloss at 60° of the back face of the second matte layer 4 is less than the lower limit, the second matte layer 4 may have a higher haze value and may accordingly have a low light transmittance, so that the liquid crystal display device including the laminate sheet 1 may have an insufficient face luminance. To the contrary, when the gloss at 60° of the back face of the second matte layer 4 is greater than the upper limit, the second matte layer 4 may perform insufficient light diffusion function, and thus the lack in uniformity of luminance caused by the shape of the other optical member disposed on the back face side of the laminate sheet 1 may not be reduced sufficiently.

The lower limit of the ratio of the gloss at 60° of the back face of the second matte layer 4 (the gloss at 60° of the back face of the laminate sheet 1) to the gloss at 60° of the front face of the first matte layer 3 (the gloss at 60° of the front face of the laminate sheet 1) is 3/2, preferably 2, and more preferably 4. On the other hand, the upper limit of the ratio of the gloss at 60° of the back face of the second matte layer 4 to the gloss at 60° of the front face of the first matte layer 3 is 10, preferably 8, and more preferably 6. When the ratio of the gloss at 60° of the back face of the second matte layer 4 is less than the lower limit, the light diffusion function of the second matte layer 4 may be unduly enhanced, so that the liquid crystal display device including the laminate sheet 1 may have an insufficient face luminance. To the contrary, when the ratio of the gloss at 60° of the back face of the second matte layer 4 is greater than the upper limit, the lack in uniformity of luminance caused by the shape of the other optical member disposed on the back face side of the laminate sheet 1 may not be reduced sufficiently. Meanwhile, the configuration in which the gloss at 60° of the back face of the second matte layer 4 falls within the above range enables the reduction in the lack in uniformity of luminance caused by the shape of the other optical member disposed on the back face side and also enables inhibition of sparkles caused by the interference with the pixel pitch of the liquid crystal panel.

The lower limit of the arithmetic average roughness (Ra) of the back face of the second matte layer 4 (the arithmetic average roughness (Ra) of the back face of the laminate sheet 1) is preferably 0.1 μm, and more preferably 0.3 μm. On the other hand, the upper limit of the arithmetic average roughness (Ra) of the back face of the second matte layer 4 is preferably 0.8 μm, and more preferably 0.6 μm. When the arithmetic average roughness (Ra) of the back face of the second matte layer 4 is less than the lower limit, the lack in uniformity of luminance caused by the shape of the other optical member disposed on the back face side of the laminate sheet 1 may not be reduced sufficiently. To the contrary, when the arithmetic average roughness (Ra) of the back face of the second matte layer 4 is greater than the upper limit, the light diffusion function of the second matte layer 4 may be unduly enhanced, so that the liquid crystal display device including the laminate sheet 1 may have an insufficient face luminance.

The lower limit of the ratio of the arithmetic average roughness (Ra) of the back face of the second matte layer 4 to the arithmetic average roughness (Ra) of the front face of the first matte layer 3 is preferably 1/5, and more preferably 2/5. On the other hand, the upper limit of the ratio of the arithmetic average roughness (Ra) of the back face of the second matte layer 4 to the arithmetic average roughness (Ra) of the front face of the first matte layer 3 is preferably 9/10, and more preferably 4/5. When the ratio of the arithmetic average roughness (Ra) of the back face of the second matte layer 4 is less than the lower limit, the lack in uniformity of luminance caused by the shape of the other optical member disposed on the back face side of the laminate sheet 1 may not be reduced sufficiently. To the contrary, when the ratio of the arithmetic average roughness (Ra) of the back face of the second matte layer 4 is greater than the upper limit, the light diffusion function of the second matte layer 4 may be unduly enhanced, so that the liquid crystal display device including the laminate sheet 1 may have an insufficient face luminance.

The lower limit of the ten-point average roughness (Rzjis) of the back face of the second matte layer 4 (the ten-point average roughness (Rzjis) of the back face of the laminate sheet 1) is preferably 1 μm, more preferably 1.5 μm, and still more preferably 1.7 μm. On the other hand, the upper limit of the ten-point average roughness (Rzjis) of the back face of the second matte layer 4 is preferably 3.5 μm, more preferably 3 μm, and still more preferably 2.5 μm. When the ten-point average roughness (Rzjis) of the back face of the second matte layer 4 is less than the lower limit, rays of light may be diffused insufficiently, and thus the lack in uniformity of luminance caused by the shape of the other optical member disposed on the back face side of the laminate sheet 1 may not be reduced sufficiently. To the contrary, when the ten-point average roughness (Rzjis) of the back face of the second matte layer 4 is greater than the upper limit, the light diffusion function of the second matte layer 4 may be unduly enhanced, so that the liquid crystal display device including the laminate sheet 1 may have an insufficient face luminance.

The lower limit of the ratio of the ten-point average roughness (Rzjis) of the back face of the second matte layer 4 (the ten-point average roughness (Rzjis) of the back face of the laminate sheet 1) to the ten-point average roughness (Rzjis) of the front face of the first matte layer 3 (the ten-point average roughness (Rzjis) of the front face of the laminate sheet 1) is preferably 1/5, and more preferably 2/5. On the other hand, the upper limit of the ratio of the ten-point average roughness (Rzjis) of the back face of the second matte layer 4 to the ten-point average roughness (Rzjis) of the front face of the first matte layer 3 is preferably 9/10, and more preferably 4/5. When the ratio of the ten-point average roughness (Rzjis) of the back face of the second matte layer 4 is less than the lower limit, the lack in uniformity of luminance caused by the shape of the other optical member disposed on the back face side of the laminate sheet 1 may not be reduced sufficiently. To the contrary, when the ratio of the ten-point average roughness (Rzjis) of the back face of the second matte layer 4 is greater than the upper limit, the light diffusion function of the second matte layer 4 may be unduly enhanced, so that the liquid crystal display device including the laminate sheet 1 may have an insufficient face luminance.

The lower limit of the average length (RSm) of the roughness profile elements of the back face of the second matte layer 4 (the average length (RSm) of the roughness profile elements of the back face of the laminate sheet 1) is preferably 120 μm, more preferably 140 μm, and still more preferably 160 μm. On the other hand, the upper limit of the average length (RSm) of the roughness profile elements of the back face of the second matte layer 4 is preferably 250 μm, more preferably 230 μm, and still more preferably 210 μm. When the average length (RSm) of the roughness profile elements of the back face of the second matte layer 4 is out of the above range, it may be difficult to form the shape of the back face of the second matte layer 4 so as to enable the reduction in the lack in uniformity of luminance caused by the shape of the other optical member disposed on the back face side and to enable sufficient inhibition of the decrease in the face luminance of the liquid crystal display device including the laminate sheet 1.

The ratio of the average length (RSm) of the roughness profile elements of the back face of the second matte layer 4 (the average length (RSm) of the roughness profile elements of the back face of the laminate sheet 1) to the average length (RSm) of the roughness profile elements of the front face of the first matte layer 3 (the average length (RSm) of the roughness profile elements of the front face of the laminate sheet 1) is preferably no less than 6/5, and more preferably no less than 7/5. On the other hand, the ratio of the average length (RSm) of the roughness profile elements of the back face of the second matte layer 4 to the average length (RSm) of the roughness profile elements of the front face of the first matte layer 3 is preferably no greater than 3, and more preferably no greater than 2. When the ratio of the average length (RSm) of the roughness profile elements of the back face of the second matte layer 4 is out of the above range, it may be difficult to adjust the shape of the front face of the first matte layer 3 and the shape of the back face of the second matte layer 4. This may lead to difficulty in enabling, the reduction in the lack in uniformity of luminance caused by the shape of the other optical member disposed on the back face side of the laminate sheet 1, and inhibition of sparkles caused by the interference between the pixel pitch of the liquid crystal panel and the projections and recesses of the front face of the first matte layer 3, as well as inhibition of the decrease in the face luminance of the liquid crystal display device including the laminate sheet 1.

For the laminate sheet 1, it is particularly preferred that both the ratio of the ten-point average roughness (Rzjis) of the back face of the second matte layer 4 to the ten-point average roughness (Rzjis) of the front face of the first matte layer 3, and the ratio of the average length (RSm) of the roughness profile elements of the back face of the second matte layer 4 to the average length (RSm) of the roughness profile elements of the front face of the first matte layer 3 fall within the respective ranges. When the ratio of the ten-point average roughness (Rzjis) and the ratio of the average length (RSm) of the roughness profile elements fall within the respective ranges, the laminate sheet 1 readily enables inhibition of the decrease in face luminance while sufficiently reducing the lack in uniformity of luminance caused by the shape of the other optical member disposed on the back face side of the laminate sheet 1.

The lower limit of the maximum height roughness (Rz) of the back face of the second matte layer 4 (the maximum height roughness (Rz) of the back face of the laminate sheet 1) is preferably 1 μm, more preferably 1.5 μm, and still more preferably 2 μm. On the other hand, the upper limit of the maximum height roughness (Rz) of the back face of the second matte layer 4 is preferably 13 μm, more preferably 8 μm, and still more preferably 6 μm. When the maximum height roughness (Rz) of the back face of the second matte layer 4 is less than the lower limit, the lack in uniformity of luminance caused by the shape of the other optical member disposed on the back face side of the laminate sheet 1 may not be reduced sufficiently. To the contrary, when the maximum height roughness (Rz) of the back face of the second matte layer 4 is greater than the upper limit, the light diffusion function of the second matte layer 4 may be unduly enhanced, so that the liquid crystal display device including the laminate sheet 1 may have an insufficient face luminance.

The lower limit of the ratio of the maximum height roughness (Rz) of the back face of the second matte layer 4 (the maximum height roughness (Rz) of the back face of the laminate sheet 1) to the maximum height roughness (Rz) of the front face of the first matte layer 3 (the maximum height roughness (Rz) of the front face of the laminate sheet 1) is preferably 1/5, and more preferably 2/5. On the other hand, the upper limit of the ratio of the maximum height roughness (Rz) of the back face of the second matte layer 4 to the maximum height roughness (Rz) of the front face of the first matte layer 3 is preferably 9/10, and more preferably 4/5. When the ratio of the maximum height roughness (Rz) of the back face of the second matte layer 4 is less than the lower limit, the lack in uniformity of luminance caused by the shape of the other optical member disposed on the back face side of the laminate sheet 1 may not be reduced sufficiently. To the contrary, when the ratio of the maximum height roughness (Rz) of the back face of the second matte layer 4 is greater than the upper limit, the light diffusion function of the second matte layer 4 may be unduly enhanced, so that the liquid crystal display device including the laminate sheet 1 may have an insufficient face luminance.

Since the second matte layer 4 needs to transmit rays of light, the second matte layer 4 contains a transparent, in particular a colorless and transparent synthetic resin as a principal component. The principal component of the second matte layer 4 may be similar to the principal component of the first matte layer 3. In particular, the first matte layer 3 and the second matte layer 4 of the laminate sheet 1 each preferably contain an amorphous resin as the principal component. In the laminate sheet 1, by virtue of containing an amorphous resin as the principal component in the first matte layer 3 and the second matte layer 4 to improve the transparency thereof, inhibition of the reduction in luminance is enabled. Furthermore, since the amorphous resin has superior impact resistance, inhibition of the generation of scratches on the laminate sheet 1 is enabled. An additional advantage of the first matte layer 3 and the second matte layer 4 each containing an amorphous resin as the principal component is that unevenness in the stress applied to the front and back faces of the intermediate layer 2 is reduced, whereby inhibition of the occurrence of curling is enabled.

It is to be noted the second matte layer 4 may contain, in addition to the principal component, various types of additives such as an antioxidant, an antistatic agent, a fire retardant, a heat stabilizer, an ultraviolet ray absorbing agent, a fungicide, a plasticizer, a tackifier and a reinforcing agent.

It is preferred that the second matte layer 4 does not contain a light diffusing agent. When the second matter layer 4 does not contain a light diffusing agent, the control of the haze value of the second matte layer 4 is facilitated.

The upper limit of the retardation value (Ra) of the second matte layer 4 is preferably 50 nm, more preferably 20 nm, and still more preferably 10 nm. When the retardation value (Ra) of the second matte layer 4 is greater than the upper limit, the polarization orientation conversion may not be sufficiently reduced, and thus the face luminance of the liquid crystal display device including the laminate sheet 1 may not be sufficiently improved. It is to be noted that the lower limit of the retardation value (Ra) of the second matte layer 4 is not particularly limited, and may be, for example, 0 nm.

The lower limit of the haze value of the second matte layer 4 is preferably 10%, more preferably 15%, and still more preferably 17%. On the other hand, the upper limit of the haze value of the second matte layer 4 is preferably 40%, more preferably 30%, and still more preferably 25%. When the haze value of the second matte layer 4 is less than the lower limit, rays of light may be diffused insufficiently, and thus the lack in uniformity of luminance caused by the shape of the other optical member disposed on the back face side of the laminate sheet 1 may not be reduced sufficiently. To the contrary, when the haze value of the second matte layer 4 is greater than the upper limit, the luminance of the liquid crystal display device including the laminate sheet 1 may not be sufficiently improved.

Adhesives

As the adhesives 5 and 6, well-known adhesives such as UV-curable adhesives, pressure sensitive adhesives and solvent adhesives may be used. Of these, UV-curable adhesives are preferred as the adhesives 5 and 6. In the case where the UV-curable adhesives are used as the adhesives 5 and 6, reductions in volume upon curing of the adhesives 5 and 6 are inhibited, and thus the occurrence of curling of the intermediate layer 2 is readily inhibited.

The principal component of each of the adhesives 5 and 6 is not particularly limited, and examples thereof include an acrylic resin, an epoxy resin, a polyester, a polyurethane, a polyolefin, a silicone resin, and the like.

The lower limit of the average thickness of each of the adhesives 5 and 6 is preferably 5 μm, and more preferably 10 μm. On the other hand, the upper limit of the average thickness of each of the adhesives 5 and 6 is preferably 100 μm, and more preferably 50 μm. When the average thickness of each of the adhesives 5 and 6 is less than the lower limit, insufficient adhesion of the intermediate layer 2 to the first matte layer 3 and the second matte layer 4 may be provided. To the contrary, when the average thickness of each of the adhesives 5 and 6 is greater than the upper limit, the laminate sheet 1 may be unduly thickened and curling of the intermediate layer 2 may occur.

Production Method

Figure 2:
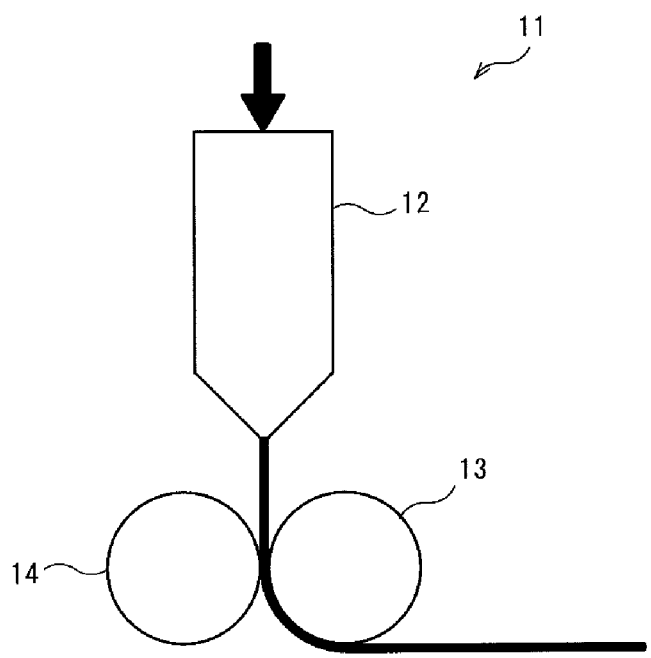
FIG. 2 shows a schematic view of a device for producing the laminate sheet shown in FIG. 1.

The production method of the laminate sheet 1 will be described below. The production method of the laminate sheet 1 include a first extrusion step, a first pressurization step, a first bonding step, a second extrusion step, a second pressurization step and a second bonding step. The first extrusion step and the first pressurization step are performed by using an extrusion molding device 11 illustrated in FIG. 2. The extrusion molding device 11 includes an extruder, a T-die 12, a first mat roller 13, a first press roller 14, and a winder (not shown). As the T-die 12, a well-known die such as a fish tail die, a manifold die or a coat hanger die may be used. The first mat roller 13 and the first press roller 14 are adjacently disposed in parallel. The extruder and the T-die 12 are capable of extruding a molten resin to give a sheet shape between the nip of the first mat roller 13 and the nip of the first press roller 14. The first mat roller 13 and the first press roller 14 each include temperature control means, thereby being capable of optimizing the surface temperature for extrusion molding. It is preferred that a metal flexible roller including a metal roller and a flexible roller covered with an elastic body is used as the first mat roller 13. On the other hand, it is preferred that a metal mirror roller is used as the first press roller 14. Alternatively, a metal flexible roller including a metal roller and a flexible roller covered with an elastic body may be used as the first mat roller 14. The entire peripheral surface of the first mat roller 13 has projections and recesses, and thus the peripheral surface of the first mat roller 13 serves as a mold for forming the pattern of the front face of the first matte layer 3. The second extrusion step and the second pressurizing step may be carried out by using an extrusion molding device (not shown) that has a configuration similar to that of the extrusion molding device 11 except that the device includes, in place of the first mat roller 13, a second mat roller whose peripheral surface serves as the mold for forming the pattern of the front face of the second matte layer 4.

First Extrusion Step

In the first extrusion step, a molten material for forming the first matte layer is extruded to give a sheet shape. The first extrusion step is carried out by a melt extrusion molding process in which the molten material for forming the first matte layer is fed into the T-die 12 and then extruded from the extruder and the T-die 12 toward the nip of the first mat roller 13 and the nip of the first press roller 14. It is to be noted that the melting temperature of the material for forming the first matte layer to be extruded from the T-die 12 is appropriately determined, taking into consideration, for example, the melting point of a resin to be used.

First Pressurization Step

After being extruded in the first extrusion step, the molten material for forming the first matte layer is sequentially pressurized between the first mat roller 13 and the first press roller 14 in the first pressurizing step. The first pressurization step is carried out by, for example, using the metal flexible roller as the first mat roller 13 and using the metal roller as the first press roller 14, with an appropriate clearance being left between the first mat roller 13 and the first press roller 14, so that the gloss at 60° of the contact surface of the material for forming the first matte layer is adjusted to be, for example, no less than 5 and no greater than 20, the contact surface having been pressed into contact with the first mat roller 13 in the first pressurization step.

First Bonding Step

After being pressurized in the first pressurization step, the material for forming the first matte layer is bonded to the front face side of the intermediate layer 2 on the contact surface with the first press roller 14 in the first bonding step. The first bonding step is carried out in such a manner that the contact surface of the material for forming the first matte layer that has been pressed into contact with the first press roller 14 is bonded to the front face of the intermediate layer 2 with the adhesive 5. Thus, the first matte layer 3 is formed on the front face side of the intermediate layer 2 in the first bonding step, with the gloss at 60° of the front face of the first matte layer 3 being, for example, no less than 5 and no greater than 20.

Second Extrusion Step

In the second extrusion step, a molten material for forming the second matte layer is extruded to give a sheet shape. The second extrusion step is carried out by a melt extrusion molding process in which the molten material for forming the second matte layer is fed into the T-die and then extruded from the extruder and the T-die toward the nip of the second mat roller and the nip of the second press roller. It is to be noted that the melting temperature of the material for forming the second matte layer to be extruded from the T-die is appropriately determined, taking into consideration, for example, the melting point of a resin to be used.

Second Pressurization Step

After being extruded in the second extrusion step, the molten material for forming the second matte layer is sequentially pressurized between the second mat roller and the second press roller in the second pressurizing step. The second pressurization step is carried out by, for example, using the metal flexible roller as the second mat roller and using the metal roller as the second press roller, with an appropriate clearance being left between the second mat roller and the second press roller, so that the ratio of the gloss at 60° of the contact surface of the material for forming the second matte layer to the gloss at 60° of the front face of the first matte layer 3 is no less than 3/2 and no greater than 10, the contact surface having been pressed into contact with the second mat roller in the second pressurization step.

Second Bonding Step

After being pressurized in the second pressurization step, the material for forming the second matte layer is bonded to the back face side of the intermediate layer 2 on the contact surface with the second press roller in the second bonding step. The second bonding step is carried out in such a manner that the contact surface of the material for forming the second matte layer that has been pressed into contact with the second press roller is bonded to the back face of the intermediate layer 2 with the adhesive 6. Thus, the second matte layer 4 is formed on the back face side of the intermediate layer 2 in the second bonding step, with the ratio of the gloss at 60° of the back face of the second matte layer 4 to the gloss at 60° of the front face of the first matte layer 3 being, for example, no less than 3/2 and no greater than 10.

Advantages

When disposed between the liquid crystal panel and the optical sheet, the laminate sheet 1 enables inhibition of the lack in uniformity of luminance caused by the shape of the optical sheet and inhibition of sparkles caused by the interference with the pixel pitch of the liquid crystal panel. Although not necessarily clarified, the reasons for the aforementioned effects are inferred as in the following. The laminate sheet 1 includes the first matte layer 3 laminated on the front face side of the intermediate layer 2 and the second matte layer 4 laminated on the back face side of the intermediate layer 2. In addition, the ratio of the gloss at 60° of the back face of the second matte layer 4 to the gloss at 60° of the front face of the first matte layer 3 is no less than 3/2 and no greater than 10. Accordingly, the rays of light incident from the back face side are diffused by the back face of the second matte layer 4 to some extent, and then are adequately diffused by the front face of the first matte layer 3 before exiting from the front face side. This would enable the reduction in the lack in uniformity of luminance caused by the shape of the other optical member disposed on the back face side. Furthermore, since the ratio of the gloss at 60° of the front face of the first matte layer 3 to the gloss at 60° of the back face of the second matte layer 4 is no less than 1/10 and no greater than 2/3, rays of light emitted from the front face are diffused adequately, and thus the laminate sheet 1 would enable the inhibition of sparkles caused by the interference with the pixel pitch of the liquid crystal panel. In addition, rays of light insufficiently diffused by the first matte layer 3 interfere at extended intervals, and when the interval is greater than each liquid crystal cell, the intensity of light may vary among liquid crystal cells. To the contrary, when rays of light sufficiently diffused by the first matte layer 3 interfere at shorter intervals, the intensity of light may vary within each liquid crystal cell, and accordingly the intensity of light would be less likely to vary among liquid crystal cells.

By virtue of the intermediate layer 2 of the laminate sheet 1 being a reflective polarizing layer, the reuse of rays of light reflected by the intermediate layer 2 is permitted, leading to improved utilization efficiency of light. In addition, by virtue of including the first matte layer 3 laminated on the front face side of the reflective polarizing layer, the laminate sheet 1 enables inhibition of glare caused by the reflective polarizing layer.

The production method of a laminate sheet enables the laminate sheet 1 to be produced which includes: the first matte layer 3 on the front face side of the intermediate layer 2; and the second matte layer 4 on the back face side of the intermediate layer 2, with the ratio of the gloss at 60° of the back face of the second matte layer 4 to the gloss at 60° of the front face of the first matte layer 3 being no less than 3/2 and no greater than 10.

Second Embodiment

Laminate Sheet

Figure 3:
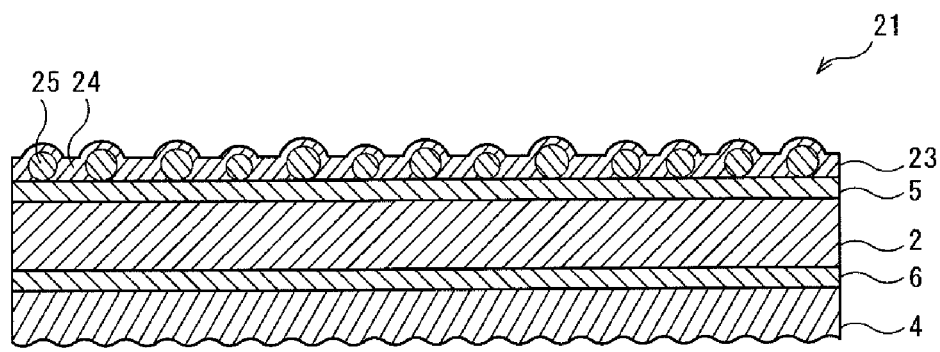
FIG. 3 shows a schematic end view of a laminate sheet according to an embodiment that is different from the laminate sheet shown in FIG. 1.

A laminate sheet 21 shown in FIG. 3 may be used in place of the laminate sheet 1 shown in FIG. 1. The laminate sheet 21 shown in FIG. 2 includes the intermediate layer 2, a first matte layer 23 laminated on the front face side of the intermediate layer 2, and the second matte layer 4 laminated on the back face side of the intermediate layer 2. The laminate sheet 21 is formed in such a manner that the intermediate layer 2 and the first matte layer 23 are bonded together with the adhesive 5 and that the intermediate layer 2 and the second matte layer 4 are bonded together with the adhesive 6. The laminate sheet 21 has a three-layer structure including the intermediate layer 2, the first matte layer 23 and the second matte layer 4. The configuration of the laminate sheet 21 is similar to the laminate sheet 1 shown in FIG. 1, except for the first matte layer 23. Thus, components other than the first matte layer 23 will not be further elaborated here.

First Matte Layer

The first matte layer 23 contains a resin matrix 24 and a light diffusing agent 25. In the first matte layer 23, the light diffusing agent 25 is dispersed in the resin matrix 24 with a substantially uniform density. The light diffusing agent 25 is surrounded by the resin matrix 24.

Since the resin matrix 24 needs to transmit rays of light, the resin matrix 24 contains a transparent, in particular a colorless and transparent synthetic resin as a principal component. The principal component of the resin matrix 24 may be similar to the principal component of the first matte layer 3 shown in FIG. 1. It is to be noted the resin matrix 24 may contain, in addition to the principal component, various types of additives such as an antioxidant, an antistatic agent, a fire retardant, a heat stabilizer, an ultraviolet ray absorbing agent, a fungicide, a plasticizer, a tackifier and a reinforcing agent.

The light diffusing agent 25 refers to particles having a property of diffusing rays of light, and is classified roughly into an inorganic filler and an organic filler. Examples of the inorganic filler include silica, aluminum hydroxide, aluminum oxide, zinc oxide, barium sulfide, magnesium silicate, and a mixture thereof. Examples of a specific material of the organic filler include acrylic resins, acrylonitrile resins, polyurethane, polyvinyl chloride, polystyrene, polyamide, polyacrylonitrile, and the like. Of these, highly transparent acrylic resins are preferred, and polymethyl methacrylate (PMMA) is particularly preferred.

The shape of the light diffusing agent 25 is not particularly limited, and may be for example, spherical, cubic, needle-like, rod-like, spindle-like, plate-like, scale-like, fiber-like, and the like. In particular, spherical beads are preferred in light of superior light diffusibility.

The lower limit of the average particle diameter of the light diffusing agent 25 is preferably 1 µm, and more preferably 2 µm. On the other hand, the upper limit of the average particle diameter of the light-diffusing agent 25 is preferably 10 µm, and more preferably 5 µm. When the average particle diameter of the light diffusing agent 25 is less than the lower limit, the projections and recesses of the front face of the first matte layer 23, which are generated by the light diffusing agent 25, become so small that sufficient light diffusibility may not be attained. To the contrary, when the average particle diameter of the light diffusing agent 25 is greater than the upper limit, the projections and recesses of the front face of the first matte layer 23 may be too large so that the liquid crystal display device including the laminate sheet 21 may have an insufficient face luminance.

The lower limit of the amount of the light diffusing agent 25 blended (the amount thereof on solid content basis with respect to 100 parts by mass of the resin matrix) is preferably 3 parts by mass, and more preferably 5 parts by mass. On the other hand, the upper limit of the amount of the light diffusing agent 25 blended is preferably 40 parts by mass, and more preferably 30 parts by mass. When the amount of the light diffusing agent 25 blended is less than the lower limit, the light diffusibility may be insufficient. To the contrary, when the amount of the light diffusing agent 25 blended is greater than the upper limit, the haze value of the first matte layer 23 become too high so that the liquid crystal display device including the laminate sheet 21 may have an insufficient face luminance.

It is to be noted that the gloss at 60°, the arithmetic average roughness (Ra), the ten-point average roughness (Rzjis), the average length (RSm) of the roughness profile elements, and the maximum height roughness (Rz) of the front face of the first matte layer 23 (the front face of the laminate sheet 21) may be similar to those of the first matte layer 3 shown in FIG. 1. Also, the retardation value (Ra), the haze value, and the average thickness of the first matte layer 23 may be similar to those of the first matte layer 3 shown in FIG. 1.

Production Method

Similarly to the laminate sheet 1 shown in FIG. 1, the laminate sheet 21 may be produced by the production method including a first extrusion step, a first pressurization step, a first bonding step, a second extrusion step, a second pressurization step and a second bonding step.

Advantages

In the laminate sheet 21, the first matte layer 23 contains the resin matrix 24 and the light diffusing agent 25 dispersed in the resin matrix 24. Thus, rays of light emitted from the front face are readily diffused due to the external diffusion arising from the shape of the front face of the first matte layer 23 and the internal diffusion arising from, for example, the difference between the refractive indices of the light diffusing agent 25 and the resin matrix 24.

Liquid Crystal Display Device

Figure 4:
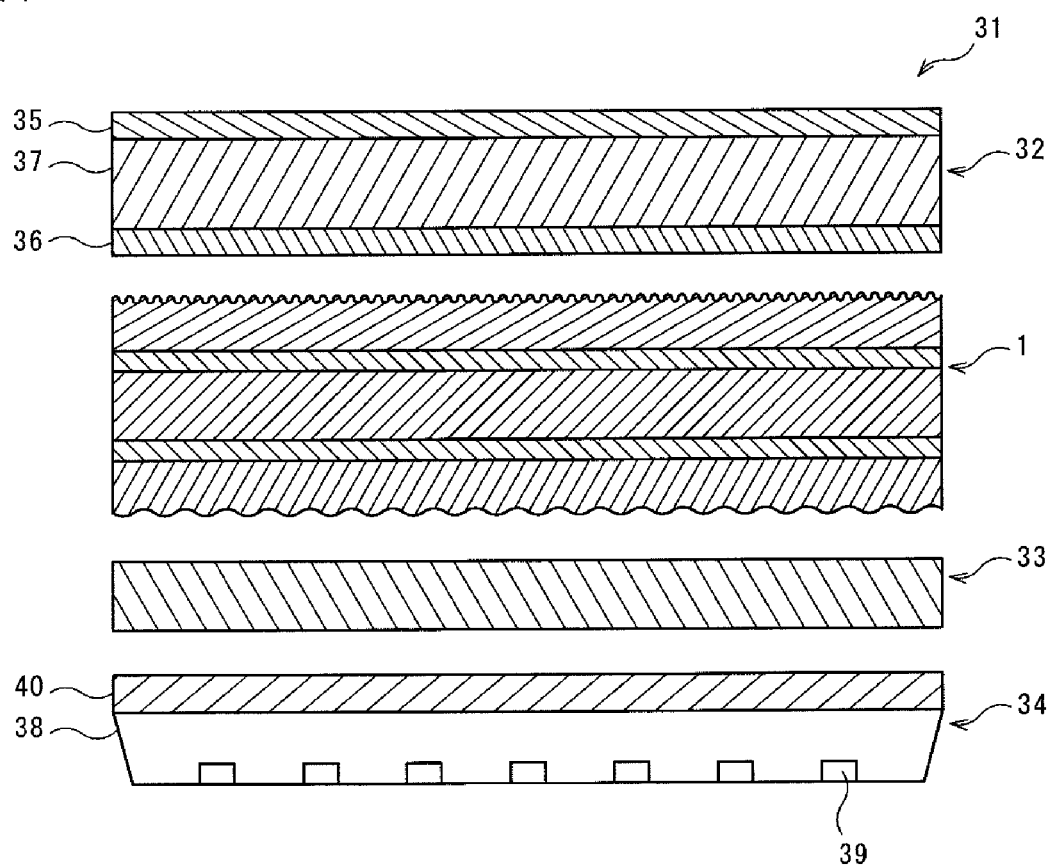
FIG. 4 shows a schematic end view of a liquid crystal display device including the laminate sheet shown in FIG. 1.
Figure 5A:
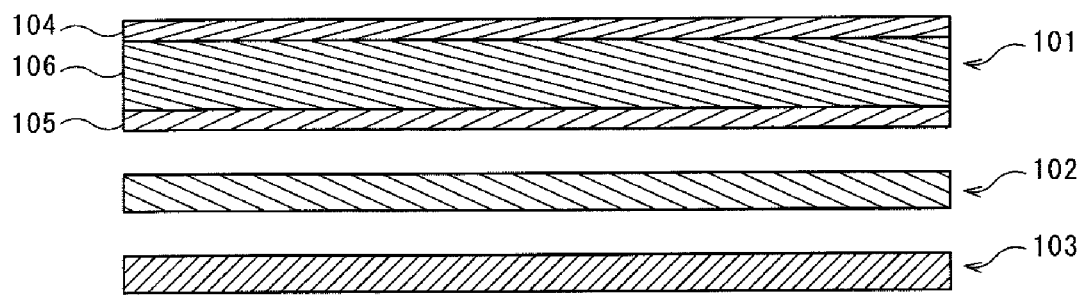
FIG. 5 shows a schematic end view of a conventional liquid crystal display device, illustrating: (a) a liquid crystal display device including no reflective polarizing sheet; and (b) a liquid crystal display device including a reflective polarizing sheet.
Figure 5B:
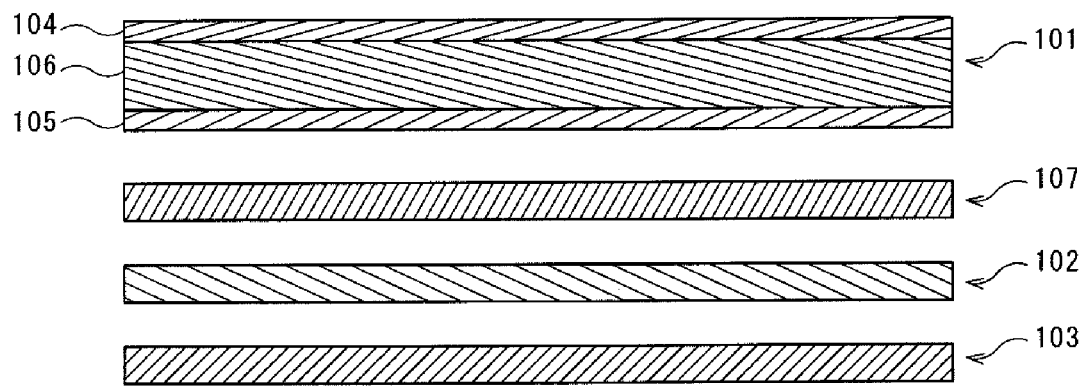

The liquid crystal display device including the laminate sheet 1 shown in FIG. 1 will be described below with reference to FIG. 4. The liquid crystal display device shown in FIG. 4 is configured as a comparatively large-sized display device such as a personal computer or a liquid crystal television. The liquid crystal display device includes a liquid crystal display module 31.

Liquid Crystal Display Module

The liquid crystal display module 31 is a direct-lit liquid crystal display module and includes the laminate sheet 1, a liquid crystal panel 32 disposed on the front face of the laminate sheet 1, an optical sheet 33 disposed on the back face of the laminate sheet 1, and a backlight 34 disposed on the back face of the optical sheet 33. The laminate sheet 1, the optical sheet 33 and the backlight 34 constitute a backlight unit of the liquid crystal display device. The liquid crystal panel 32, the laminate sheet 1, the optical sheet 33 and the backlight 34 have substantially the same rectangular shape in a planar view, and are laminated in the stated order from the front face side to the back face side.

Liquid Crystal Panel

The liquid crystal panel 32 includes a front face side-polarizing plate 35 and a back face side-polarizing plate 36, which are substantially parallel with each other with a predetermined gap therebetween, and also includes a liquid crystal cell 37 interposed therebetween. The front face side-polarizing plate 35 and the back face side-polarizing plate 36 each include, for example, a polarizer such as an iodine-based polarizer, a dye-based polarizer or a polyene-based polarizer, and a pair of transparent protective films disposed on both sides of the polarizer. The transmission axial orientation of the front face side-polarizing plate 35 is orthogonal to the transmission axial orientation of the back face side-polarizing plate 36.

The liquid crystal cell 37 has the function of controlling the amount of light to be transmitted, and may be of various well-known types. The liquid crystal cell 37 commonly has a laminated structure including one substrate, a color filter, a counter electrode, a liquid crystal layer, a pixel electrode, another substrate, and the like. The pixel electrode is a transparent conductive film formed from, for example, ITO. The display mode of the liquid crystal cell 37 is exemplified by the twisted nematic (TN) mode, the vertical alignment (VA) mode, the in plane switching (IPS) mode, the ferroelectric liquid crystal (FLC) mode, the anti-ferroelectric liquid crystal (AFLC) mode, the optically compensatory bend (OCB) mode, the supper twisted nematic (STN) mode, the hybrid aligned nematic (HAN) mode, and the like. The pixel pitch of the liquid crystal panel 32 (the pixel pitch of the liquid crystal cell 37) may be, for example, no greater than 25 μm.

Laminate Sheet

The laminate sheet 1 is disposed immediately below the liquid crystal panel 32. The transmission axial orientation of the intermediate layer 2 of the laminate sheet 1 is parallel with the transmission axial orientation of the back face side-polarizing plate 36 of the liquid crystal panel 32.

Optical Sheet

Examples of the optical sheet 33 include a light diffusion sheet, a prism sheet, a micro lens sheet, and the like. The light diffusion sheet, the prism sheet and the micro lens sheet may be each used either alone, or two or more sheets may be used in combination.

Backlight

The backlight 34 is a direct-lit surface illuminant device and illuminates the liquid crystal panel 32 from the back face side. The backlight 34 includes, for example, a casing 38, a plurality of light sources 39, a diffusion plate 40, and the like. The casing 38 is formed so as to have a rectangular tray-like shape (a shallow lidless box-like shape), and includes a reflection layer such as a metal film inside so as to allow rays of light to exit to the front face side. The plurality of light sources 39 are commonly LEDs. The diffusion plate 40 is, for example, a resin plate formed from, for example, an acrylic resin or a polycarbonate containing an inorganic filler, etc. dispersed therein.

Advantages

By virtue of the laminate sheet 1 being disposed on the back face of the liquid crystal panel 32, the liquid crystal display module 31 enables inhibition of sparkles caused by the interference with the pixel pitch of the liquid crystal panel 32. Furthermore, by virtue of the laminate sheet 1 being disposed on the back face of the liquid crystal panel 32, the liquid crystal display module 31 enables the reduction in the lack in uniformity of luminance caused by the shape of the other optical member disposed on the back face side of the laminate sheet 1.

By virtue of the laminate sheet 1 being disposed on the front face of the optical sheet 33, the backlight unit enables inhibition of sparkles caused by the interference with the pixel pitch of the liquid crystal panel 32 while reducing the lack in uniformity of luminance caused by the shape of the optical sheet 33.

By virtue of including the liquid crystal display module 31, the liquid crystal display device enables inhibition of sparkles caused by the interference with the pixel pitch of the liquid crystal panel 32 and also enables the reduction in the lack in uniformity of luminance caused by the shape of the other optical member disposed on the back face side of the laminate sheet 1.

Other Embodiments

It is to be noted that the laminate sheet, the liquid crystal display module, the backlight unit, and the production method of a laminate sheet according to the embodiments of the present invention may also be exploited in various modified or improved embodiments other than those described above. For example, other layers may be interposed between the intermediate layer and the first matte layer and between the intermediate layer and the second matte layer. Furthermore, a layer such as a hard coat layer may be laminated on the front face side of the first matte layer or on the back face side of the second matte layer.

In a case where the first matte layer contains a light diffusing agent, the first matte layer may have a bilayer structure including a base layer and a light diffusion layer. In this case, the light diffusion layer may contain a resin matrix and a light diffusing agent dispersed in the resin matrix. Alternatively, the second matte layer of the laminate sheet may include a resin matrix and a light diffusing agent dispersed in the resin matrix.

It is not necessary that the intermediate layer is a reflective polarizing layer. The intermediate layer may be a polarizing layer capable of absorbing one-direction component of light and transmitting the other polarization components of light. In the case where the intermediate layer is a polarizing layer, the laminate sheet may be disposed on, for example, the back face side of the liquid crystal cell of the liquid crystal panel so as to replace the back face side-polarizing plate.

Furthermore, the intermediate layer may be a base layer containing, for example, a transparent synthetic resin as a principal component. Examples of the synthetic resin include polyethylene terephthalate, polyethylene naphthalate, acrylic resins, polycarbonates, polystyrenes, polyolefins, cellulose acetate, weather resistant vinyl chlorides, and the like. In the case where the intermediate layer is the base layer, the laminate sheet is used as, for example, an upper-layer light diffusion sheet disposed between the liquid crystal panel of the liquid crystal display device and the optical sheet on the back face side of the liquid crystal panel. Also in the case of being used as the upper-layer diffusion sheet, the laminate sheet enables inhibition of the occurrence of sparkles caused by the interference with the pixel pitch of the liquid crystal panel while reducing the lack in uniformity of luminance caused by the shape of the other optical member disposed on the back face side.

It is not necessary to provide the liquid crystal display module and the backlight unit with a direct-lit backlight. Alternatively, an edge-lit backlight unit including light sources and a light-guiding plate disposed to be aligned with the light sources along the edge part thereof may be included.

The liquid crystal display device may be configured as a comparatively large-sized visual display unit such as a personal computer or a liquid crystal television, or may be configured as a mobile phone terminal such as a smartphone or a personal digital assistance such as a tablet terminal.

the first mat roller and a first press roller, whereby a first resin film was produced, with its one face having a matte finish.

Second Resin Film

The extrusion molding device extruded polycarbonate to give a sheet shape, and then pressurized the sheet between the second mat roller and a second press roller, whereby a second resin film was produced, with its one face having a matte finish.

Properties

The properties of the first resin film and the second resin film are shown in Table 1. It is to be noted that the properties shown in Table 1 were determined as described below.

Average Thickness

The thickness was measured at randomly chosen ten points, and the average thickness was obtained by averaging the thicknesses measured at the ten points.

Gloss at 60°

The gloss at 60° was determined in accordance with JIS-Z8741: 1997 by using "Gloss Mobile GM-1" available from Suga Test Instruments Co., Ltd., with the face opposite to the matte finish face of each film being covered with back marker ink.

Arithmetic Average Roughness

The arithmetic average roughness (Ra) was determined in accordance with JIS-B0601: 2001 by using "SURFTEST SJ-210" available from Mitutoyo Corporation, with a cut-off $\lambda c$ of 2.5 mm and an evaluation length of 12.5 mm.

Ten-Point Average Roughness

The ten-point average roughness (Rzjis) was determined in accordance with JIS-B0601: 1994 by using "SURFTEST SJ-210" available from Mitutoyo Corporation, with a cut-off $\lambda c$ of 2.5 mm and an evaluation length of 12.5 mm.

Average Length of Elements of Roughness Curve

The average length (RSm) of the roughness profile elements was determined in accordance with JIS-B0601: 2001 by using "SURFTEST SJ-210" available from Mitutoyo Corporation, with a cut-off $\lambda c$ of 2.5 mm and an evaluation length of 12.5 mm.

Retardation

The retardation (Re) was determined by using "KOBRAADH21" available from Oji Scientific Instruments Co., Ltd, with light (sodium D line) of 589 nm wavelength.

TABLE 1

| | Average Thickness (µm) | Gloss at 60° | Arithmetic Average Roughness (Ra) (µm) | Ten-Point Average Roughness (Rzjis) (µm) | Average Length of Elements of Roughness Curve (RSm) (µm) | Retardation (Re) (nm) |
|---|---|---|---|---|---|---|
| First Resin Film | 100 | 11.8 | 0.65 | 2.96 | 105 | 12.1 |
| Second Resin Film | 100 | 53.2 | 0.44 | 2.08 | 189 | 13.3 |

Examples

Hereinafter, the embodiments of the present invention will be described in more detail by way of Examples; however, the present invention is not in any way limited to these Examples.

No. 1

First Resin Film

The extrusion molding device extruded polycarbonate to give a sheet shape, and then pressurized the sheet between Laminate Sheet A polyethylene terephthalate (PET) film having an average thickness of 100 µm was prepared, and then, each of the face opposite to the matte finish face of the first resin film and the face opposite to the matte finish face of the second resin film was bonded to the corresponding one of two faces of the PET film with an acrylic UV-curable adhesive, whereby a laminate sheet of No. 1 was produced, with the matte finish face of the first resin film being located on the front face side and the matte finish face of the second resin film being located on the back face side.

No. 2

Laminate Sheet

A laminate sheet of No. 2 was produced similarly to the laminate sheet of No. 1 except that the matte finish face of the second resin film was located on the front face side and the matte finish face of the first resin film was located on the back face side.

No. 3

Laminate Sheet

A pair of first resin films was prepared, and then, each of the faces opposite to the matte finish faces of the pair of first resin films was bonded to the corresponding one of the two faces of the PET film with an acrylic UV-curable adhesive, whereby a laminate sheet of No. 3 was produced.

No. 4

Laminate Sheet

A pair of second resin films was prepared, and then, each of the faces opposite to the matte finish faces of the pair of second resin films was bonded to the corresponding one of the two faces of the PET film with an acrylic UV-curable adhesive, whereby a laminate sheet of No. 4 was produced.

Liquid Crystal Display Device

Each of the laminate sheets of No. 1 to No. 4 was disposed on the front face of the prism sheet of the corresponding one of the edge-lit backlight units each including: a light-guiding plate for allowing rays of light incident from the end face to travel to the front face side; a plurality of LED light sources disposed to be aligned with the end face of the light-guiding plate; a light diffusion sheet disposed on the front face of the light-guiding plate; and a prism sheet disposed on the front face of the light diffusion sheet. Subsequently, a liquid crystal panel was disposed on the front face of each laminate sheet.

Face Luminance

The face luminance of each of the liquid crystal display devices including the laminate sheets of No. 1 to No. 4 was determined by using "Color Luminance Meter BM-7" available from TOPCON TECHNOHOUSE CORPORATION. The results of the measurements are shown in Table 2.

Sparkles

Figure 6:
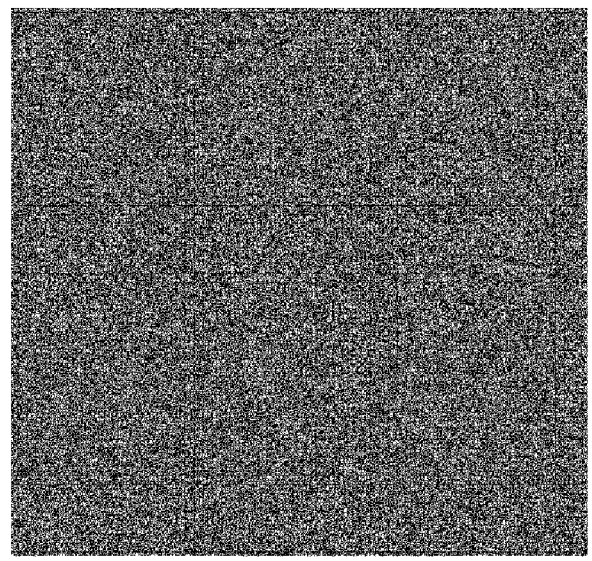
FIG. 6 is an image showing the presence or absence of sparkles in the liquid crystal display device including a laminate sheet of No. 1.
Figure 7:
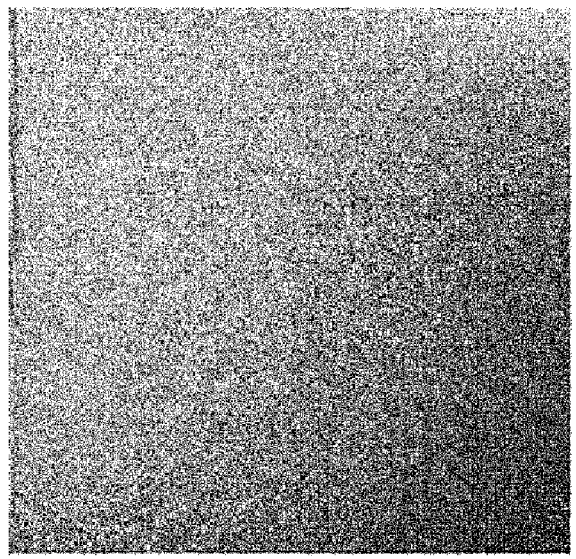
FIG. 7 is an image showing the presence or absence of sparkles in the liquid crystal display device including a laminate sheet of No. 2.

The presence or absence of sparkles in each of the liquid crystal display devices including the laminate sheets of No. 1 to No. 4 was visually determined in accordance with the following criteria. The results of the determination are shown in Table 2. The result of checking the presence or absence of sparkles in the liquid crystal display device including the laminate sheet of No. 1 is shown in FIG. 6, and the result of checking the presence or absence of sparkles in the liquid crystal display device including the laminate sheet of No. 2 is shown in FIG. 7.

A: No sparkles observed.

B: Sparkles observed.

TABLE 2

| | Luminance (cd/m$^2$) | Sparkles |
|---|---|---|
| No. 1 | 253 | A |
| No. 2 | 243 | B |
| No. 3 | 227 | A |
| No. 4 | 276 | B |

Evaluation Results

As shown in Table 2, it was revealed that the laminate sheet of No. 1 in which the ratio of the gloss at 60° of the back face of the resin film laminated on the back face side of the PET film to the gloss at 60° of the front face of the resin film laminated on the front face side of the PET film was about 4.5 enabled inhibition of sparkles while maintaining the sufficient face luminance of the liquid crystal display device. To the contrary, it was revealed that the laminate sheets of No. 2 and No. 4 failed to appropriately inhibit sparkles. It was also revealed that the laminate sheet of No. 3 caused a significant decrease in face luminance while producing the effect of inhibiting sparkles owing to the low gloss at 60° of the first resin film laminated on the front face side of the PET film.

INDUSTRIAL APPLICABILITY

As described in the foregoing, the laminate sheet, the liquid crystal display module, the backlight unit, and the production method of a laminate sheet according to the embodiments of the present invention enable inhibition of the occurrence of sparkles caused by the interference with the pixel pitch of the liquid crystal panel while reducing the lack in uniformity of luminance caused by the shape of the other optical member disposed on the back face side of the laminate sheet. Therefore, they are suitable for liquid crystal display devices in which the lack in uniformity of luminance is inhibited.

EXPLANATION OF THE REFERENCE SYMBOLS

1, 21 laminate sheet
2 intermediate layer
3, 23 first matte layer
4 second matte layer
5, 6 adhesive
11 extrusion molding device
12 T-die
13 first mat roller
14 first press roller
24 resin matrix
25 light-diffusing agent
31 liquid crystal display module
32 liquid crystal panel
33 optical sheet
34 backlight
35 front face side-polarizing plate
36 back face side-polarizing plate
37 liquid crystal cell
38 casing
39 light source
40 diffusion plate
101 liquid crystal panel
102 optical sheet
103 backlight
104, 105 polarizing plate
106 liquid crystal cell
107 reflective polarizing sheet

The invention claimed is:

1. A laminate sheet comprising:
   an intermediate layer;
   a first matte layer laminated on a front face side of the intermediate layer; and
   a second matte layer laminated on a back face side of the intermediate layer,
   wherein
   a principal component of the first matte layer is a polycarbonate, a ratio of a gloss at 60° of a back face of the second matte layer to a gloss at 60° of a front face of the first matte layer is no less than 5/2 and no greater than 10, the gloss at 60° of the front face of the first matte layer is no less than 5 and no greater than 12, the gloss at 60° of the back face of the second matte layer is no less than 30 and no greater than 80, the second matte layer does not comprise a light diffusing agent, wherein the light diffusing agent comprises particles of an inorganic or organic filler having a property of diffusing rays of light, and the first matte layer and the second matte layer, by transmitting rays of light from the back face side to the front face side, inhibit lack in uniformity of luminance and inhibit sparkles.

2. The laminate sheet according to claim 1, wherein the first matte layer and the second matte layer each comprise an amorphous resin as a principal component.

3. The laminate sheet according to claim 1, wherein a retardation value (Re) of each of the first matte layer and the second matte layer is no greater than 50 nm.

4. The laminate sheet according to claim 1, wherein the first matte layer does not comprise a light diffusing agent, wherein the light diffusing agent comprises particles of an inorganic or organic filler having a property of diffusing rays of light.

5. The laminate sheet according to claim 1, wherein the first matte layer comprises a resin matrix and a light diffusing agent.

6. The laminate sheet according to claim 1, wherein the intermediate layer is a reflective polarizing layer.

7. A liquid crystal display module comprising:
the laminate sheet according to claim 1; and
a liquid crystal panel disposed on a front face of the laminate sheet.

8. A backlight unit comprising:
the laminate sheet according to claim 1; and
an optical sheet disposed on a back face of the laminate sheet.

9. The laminate sheet according to claim 1, wherein an arithmetic average roughness (Ra) of the front face of the first matte layer is no less than 0.5 μm and no greater than 1 μm.

10. The laminate sheet according to claim 9, wherein a ratio of an arithmetic average roughness (Ra) of the back face of the second matte layer to the arithmetic average roughness (Ra) of the front face of the first matte layer is no less than 1/5 and no greater than 9/10.

11. The laminate sheet according to claim 1, wherein
a ten-point average roughness (Rzjis) of the front face of the first matte layer is no less than 1.5 μm and no greater than 4 μm, and an average length (RSm) of roughness profile elements of the front face of the first matte layer is no less than 60 μm and no greater than 140 μm.

12. The laminate sheet according to claim 11, wherein a ratio of a ten-point average roughness (Rzjis) of the back face of the second matte layer to the ten-point average roughness (Rzjis) of the front face of the first matte layer is no less than 1/5 and no greater than 9/10, and a ratio of an average length (RSm) of roughness profile elements of the back face of the second matte layer to the average length (RSm) of the roughness profile elements of the front face of the first matte layer is no less than 6/5 and no greater than 3.

13. A production method of a laminate sheet comprising:

extruding a first molten material for forming a first matte layer to give a sheet shape;

sequentially pressurizing the extruded material for forming the first matte layer between a first mat roller and a first press roller;

bonding to a front face side of an intermediate layer, the pressurized material for forming the first matte layer on a contact surface with the first press roller;

extruding a second molten material for forming a second matte layer to give a sheet shape;

sequentially pressurizing the extruded material for forming the second matte layer between a second mat roller and a second press roller; and bonding to a back face side of the intermediate layer, the pressurized material for forming the second matte layer on a contact surface with the second press roller, wherein a principal component of the first matte layer is a polycarbonate, a ratio of a gloss at 60° of a back face of the second matte layer to a gloss at 60° of a front face of the first matte layer is no less than 5/2 and no greater than 10, the gloss at 60° of the front face of the first matte layer is no less than 5 and no greater than 12, the gloss at 60° of the back face of the second matte layer is no less than 30 and no greater than 80, the second matte layer does not comprise a light diffusing agent, wherein the light diffusing agent comprises particles of an inorganic or organic filler having a property of diffusing rays of light, and the first matte layer and the second matte layer, by transmitting rays of light from the back face side to the front face side, inhibit lack in uniformity of luminance and inhibit sparkles.

* * * * *